C. I. SHIRLEY.
ADJUSTABLE SLEEVE FOR JOURNAL BEARINGS.
APPLICATION FILED MAY 25, 1909.
962,059.
Patented June 21, 1910.
2 SHEETS—SHEET 1.
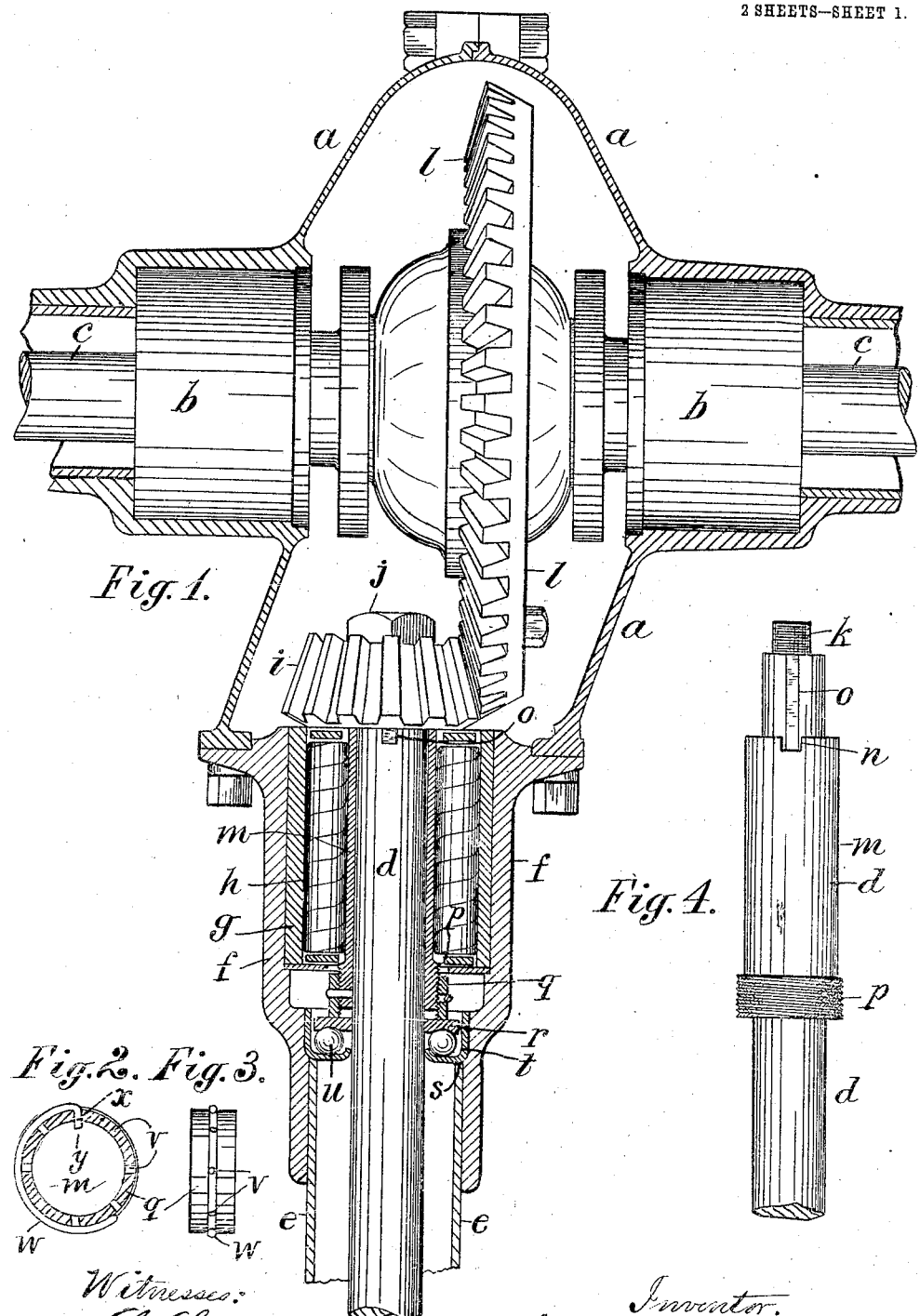

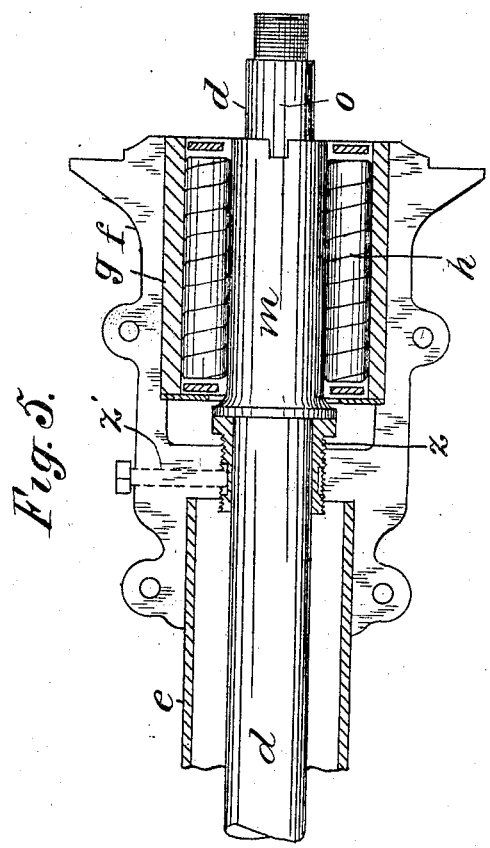

UNITED STATES PATENT OFFICE.

CEPHAS I. SHIRLEY, OF NEWARK, NEW JERSEY, ASSIGNOR TO HYATT ROLLER BEARING COMPANY, OF HARRISON, NEW JERSEY, A CORPORATION OF NEW JERSEY.

ADJUSTABLE SLEEVE FOR JOURNAL-BEARINGS.

962,059.  Specification of Letters Patent.  Patented June 21, 1910.

Application filed May 25, 1909. Serial No. 498,161.

*To all whom it may concern:*

Be it known that I, CEPHAS I. SHIRLEY, a citizen of the United States, residing at 319 Clifton avenue, Newark, county of Essex, and State of New Jersey, have invented certain new and useful Improvements in Adjustable Sleeves for Journal-Bearings, fully described and represented in the following specification and the accompanying drawings, forming a part of the same.

This invention relates to that class of roller bearings in which the shaft rotating in the bearing is provided with a wearing-sleeve to support the load upon the roll.

The purpose of the present invention is to utilize such a sleeve as a means of adjusting the shaft longitudinally when it is provided with any member, as a bevel-gear pinion, which requires adjustment longitudinally to operate in a proper manner. To adjust the shaft longitudinally, an abutment or thrust-bearing connected with the roller bearing is required, against which the thrust of the shaft may be sustained when pushed forward by the operation of the sleeve, and such abutment may be readily formed by an anti-friction thrust-collar fitted to a shoulder near one end of the roller bearing.

The invention includes any means provided upon the sleeve for transmitting the thrust of the shaft adjustably to an abutment.

The invention is illustrated in the annexed drawing, which shows in Figure 1 the gear-case of an automobile axle and driving-shaft, the parts being represented in section at the center line where hatched. Fig. 2 is a cross section of the sleeve and its nut at the center of the locking-wire; Fig. 3 is an edge view of the adjustable nut; and Fig. 4 is a side view of the shaft with the sleeve fitted thereon. Fig. 5 shows an alternative construction.

*a* designates the gear-case, and *b* the bearings for the vehicle axle *c*.

*d* designates the driving-shaft inclosed in the tube *e* and roller bearing casing *f*, the latter having a lining *g* therein and anti-friction rolls *h*. The end of the shaft *d* is shouldered down and a driving gear in the form of a bevel-pinion *i* secured thereon by a feather *o*, and a nut *j* fitted to a thread *k* upon the end of the shaft. The feather is projected a little from the back of the pinion, as shown in Fig. 1, and permits the longitudinal adjustment of the pinion.

The pinion meshes with the bevel-wheel *l* which rotates the vehicle-axle *c*, and requires adjustment to and from the axle *c* to mesh accurately with the teeth of the wheel *l*.

Within the rolls the shaft is furnished with the wearing-sleeve *m*, one end of which contacts with the back of the pinion *i* and is provided with a notch *n* to engage the projecting end of the feather *o*. The opposite end of the sleeve is provided with screw-thread *p*, upon which a nut or threaded collar *q* is fitted and bears at its outer end against a thrust-ring *r*.

An abutment is provided by the shoulder *s* adjacent to the end of the roller-bearing, against which a circular box *t* is fitted containing anti-friction balls *u* against which the ring *r* rotates.

The notched end of the sleeve contacts with the back of the pinion *i* while the collar *q* contacts with the thrust-ring *r*, and any adjustment upon the thread *p* thus operates to push the shaft forcibly forward and hold it in such adjustment.

It is obviously immaterial what form of abutment be used adjacent to the end of the roller bearing, to sustain the thrust of the agent which is used to adjust the sleeve and shaft longitudinally.

The engagement of the notch *n* with the feather *o* serves to hold the sleeve from rotating upon the shaft, while its contact with the back of the pinion prevents longitudinal movement; but any means which engages the sleeve to the shaft will enable it to push the shaft endwise when the sleeve is adjusted. To vary such adjustment in a minute degree, the collar or the sleeve may be formed with a series of holes *v*, as shown in the collar in Fig. 2, and the periphery of the collar or nut grooved to receive a spring-wire *w*. The locking wire encircles the nut and has an end *x* inserted through any selected one of the holes *v* into a hole *y* in the sleeve.

With eight holes, as shown in Fig. 2, the nut may be adjusted and locked in any position within one-eighth of a turn.

Fig. 5 shows a modification in which the sleeve *m* is unprovided with any thread, and the abutment is formed by an adjustable nut *z* threaded in one end of the bearing and arranged to contact with the end of the sleeve. The rotation of such nut serves to push the sleeve forward as may be required, and the nut when thus adjusted may be secured by the set-screw z'. Such bearings are commonly lubricated, and the end of the adjusting nut z furnishes a stationary shoulder against which the end of the sleeve revolves with proper lubrication, and thus operates like any collar upon a shaft to resist end movement. It is common to divide the gear-case and connected parts of the construction shown in the drawing, to give access to the interior so that the collar q or the nut z' may be turned to adjust the pinion i when required. The parts q and z both consist of threaded collars arranged to adjust the sleeve when required.

From the above description it will be seen that the sleeve is utilized to perform two functions, first, protecting the shaft from wear at the point in contact with the rolls h, and second, transmitting any end strain upon the shaft to a suitable abutment which may or may not be formed of a rotating thrust-ring.

In the drawing, a screw-collar is shown to adjust the sleeve longitudinally, but it is immaterial what means be employed for that purpose.

Having thus set forth the nature of the invention what is claimed herein is:

1. The combination, with a suitable bearing, of a shaft fitted to revolve in the said bearing and having a wearing-sleeve fitted to the shaft and revolving therewith in the bearing, means for holding the sleeve from rotation and end movement upon the shaft, an abutment adjacent to the bearing at one end of the sleeve, and means applied to the sleeve and to the abutment for adjusting the shaft longitudinally.

2. The combination, with a suitable bearing, of a shaft fitted to revolve in the said bearing and having a driving-gear as the bevel-pinion i, upon the shaft requiring longitudinal adjustment, a wearing-sleeve fitted to the shaft and revolving therewith in the bearing, means for holding the sleeve from rotation and end movement upon the shaft, an abutment adjacent to the bearing at the end opposite to the said driving-gear, and means applied to the sleeve and the abutment for adjusting the shaft and its attached part longitudinally.

3. In a roller bearing, the combination, with the shaft, the casing and the anti-friction rolls, of a wearing-sleeve fitted to the shaft and provided with a screw-thread at one end, means for preventing end movement of the sleeve upon the shaft, an abutment adjacent to the roller bearing, and a nut fitted adjustably to the thread upon the sleeve and contacting with the abutment for adjusting the shaft longitudinally.

4. In a roller bearing, the combination, with the shaft, the casing and the anti-friction rolls, of a wearing-sleeve fitted to the shaft and provided with a screw-thread at one end, means for preventing end movement of the sleeve upon the shaft, an abutment at one end of the roller bearing provided with an anti-friction thrust-collar, and a nut fitted to the thread upon the sleeve and contacting with the thrust-collar to adjust the shaft longitudinally.

5. In a roller bearing, the combination, with a casing and anti-friction rolls, of a shaft fitted therein, a gear pinion fitted movably upon the end of the shaft, a feather for holding the pinion adjustably upon the shaft, a wearing-sleeve fitted to the shaft contiguous to the said member and engaging at one end with the feather projected from the said member, and provided at the opposite end with a screw-thread, an abutment at such end of the roller bearing provided with an anti-friction thrust-collar, a nut fitted to the thread upon the sleeve and contacting with the thrust-collar, and means for locking the nut upon the sleeve when the shaft is suitably adjusted.

6. In a roller bearing, the combination, with the shaft and its bearing, of a wearing-sleeve having a thread upon one end for adjusting it longitudinally and having a hole for a locking-spring, an abutment adjacent to such end of the sleeve, an annular nut fitted to such thread in contact with the abutment and having a hole coincident with the hole in the sleeve when adjusted, and a spring-locking wire encircling the nut and having an end bent to penetrate the holes when adjusted, to hold the nut from turning.

In testimony whereof I have hereunto set my hand in the presence of two subscribing witnesses.

CEPHAS I. SHIRLEY.

Witnesses:
ALFRED V. STEWART,
H. E. SAUL.